Feb. 12, 1946.   G. H. EDMUNDS   2,394,673
BRASS
Filed Feb. 11, 1943   3 Sheets-Sheet 1

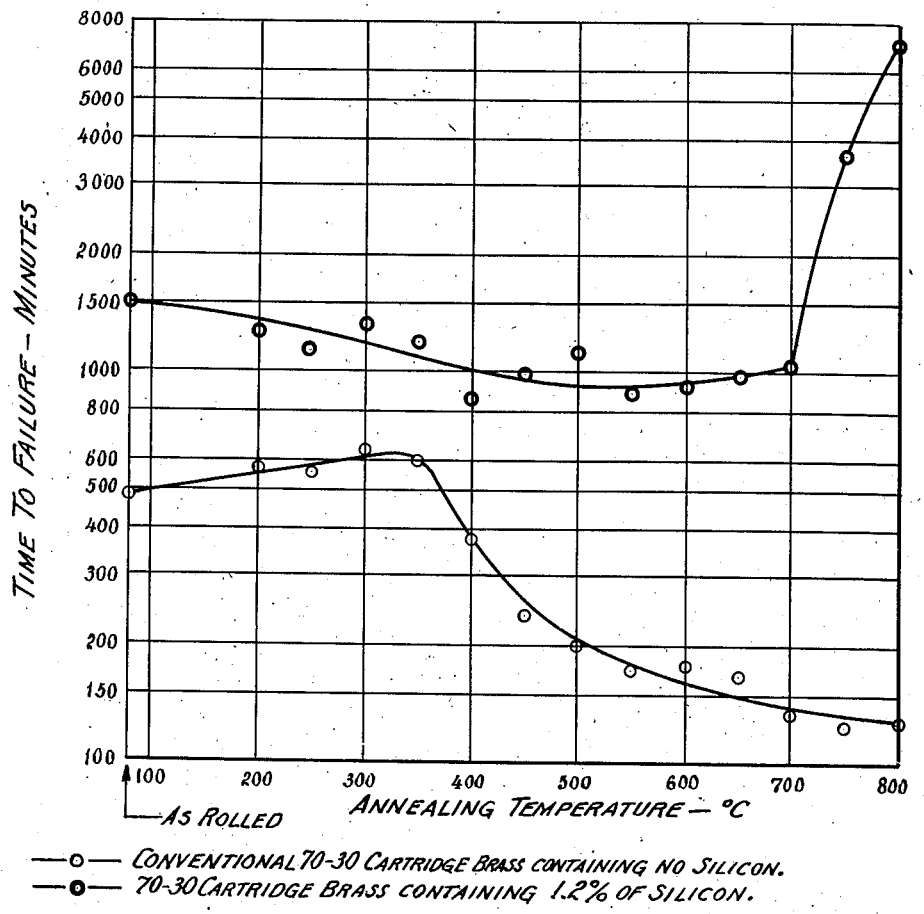

Fig. 1.

—o— CONVENTIONAL 70-30 CARTRIDGE BRASS CONTAINING NO SILICON.
—⊙— 70-30 CARTRIDGE BRASS CONTAINING 1.2% OF SILICON.

EFFECT OF HEAT TREATMENT FOLLOWED BY QUENCHING ON
RESISTANCE TO SEASON CRACKING OF SILICON BRASS
AND SILICON FREE BRASS.

HEAT TREATMENT — ½ HOUR IN NITROGEN FOLLOWED
BY WATER QUENCHING.

SEASON CRACKING TEST IN AN ATMOSPHERE OF
$NH_3$—$CO_2$—AIR—$H_2O$ UNDER STRESS OF 15,000 PSI.

INVENTOR
Gerald H. Edmunds
BY
ATTORNEYS

Feb. 12, 1946.   G. H. EDMUNDS   2,394,673
BRASS
Filed Feb. 11, 1943   3 Sheets-Sheet 2

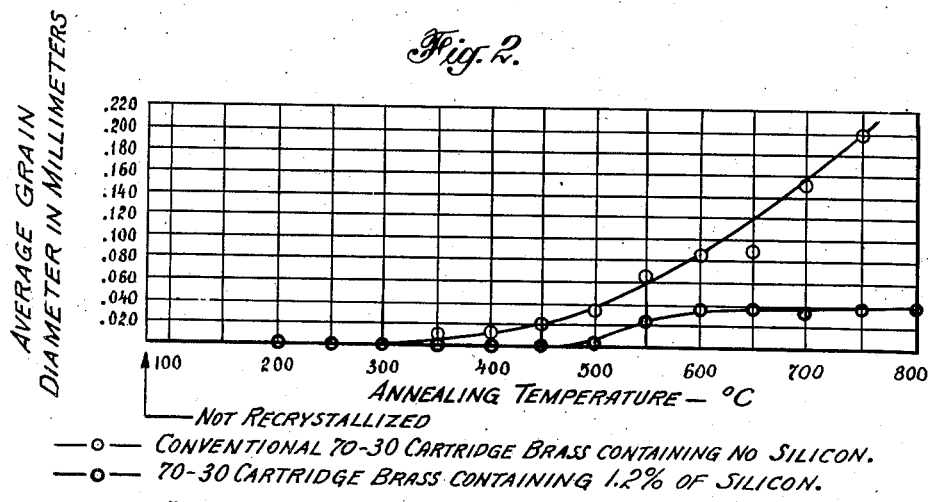

Fig. 2.

—— Not Recrystallized
—o— Conventional 70-30 Cartridge Brass containing no Silicon.
—●— 70-30 Cartridge Brass containing 1.2% of Silicon.

Effect of Heat Treatment followed by Quenching on Grain Growth of Silicon Brass and Silicon Free Brass.

Heat Treatment — ½ Hour in Nitrogen followed by Water Quenching.

INVENTOR
Gerald H. Edmunds
BY
Pennie, Davis, Marvin & Edmonds
ATTORNEYS

ROLLED 70-30 BRASS CONTAINING 1.2% SI ANNEALED ½ HOUR AT 625°C AND AIR-COOLED (75 DIAMETERS)
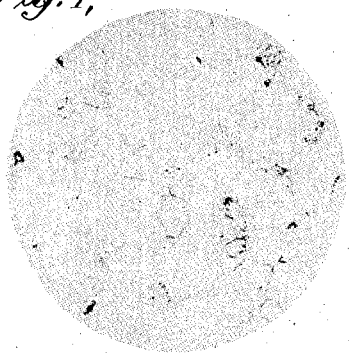
ROLLED 70-30 BRASS CONTAINING 1.2% SI ANNEALED ½ HOUR AT 800°C AND WATER-QUENCHED (250 DIAMETERS)
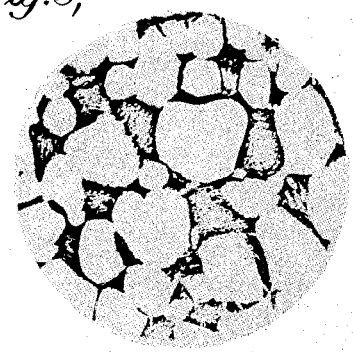
ROLLED 70-30 BRASS OF FIG. 4 RE-ANNEALED 1 HOUR AT 375°C AND AIR-COOLED (250 DIAMETERS)
ROLLED 70-30 BRASS OF FIG. 4 RE-ANNEALED 1 HR AT 375°C AND AIR-COOLED (1000 DIAMETERS)
INVENTOR.
GERALD H. EDMUNDS
BY
ATTORNEYS Patented Feb. 12, 1946

2,394,673

UNITED STATES PATENT OFFICE 2,394,673

BRASS

Gerald H. Edmunds, Palmerton, Pa., assignor to The New Jersey Zinc Company, New York, N. Y., a corporation of New Jersey Application February 11, 1943, Serial No. 475,502

6 Claims. (Cl. 75—157.5)

This invention is concerned with brass and provides a method for inhibiting season cracking in brass as well as a novel brass composition that has high resistance to season cracking.

Season cracking is a well known phenomenon and tends to develop in brasses, especially brasses containing 60 to 85% or even more copper, when the brass is exposed in a state of stress to certain corrosive environments. Thus, exposure of internally stressed brass to the action of liquid metal such as mercury or molten tin or to the action of a nitrogen compound, for example, an amine, an ammonia compound or an oxide of nitrogen tends to cause the brass to develop a series of fine cracks, which greatly impair its strength and usefulness. Season cracking is particularly troublesome in the case of cartridge brass which comes in contact with smokeless powder or a mercury compound such as fulminate, for both smokeless powder and the fulminate tend to decompose to form compounds that promote season cracking. The invention is, therefore, particularly useful in the case of cartridge brasses, which ordinarily contain in the neighborhood of 70% copper and 30% zinc, but has application to all brasses which tend to fail through season cracking.

I have discovered that the resistance of brass to season cracking can be increased tremendously by incorporating in the brass from about 0.9% to about 1.3% silicon and thereafter heat-treating the brass at a temperature ranging from 725° C. to the solidus, i. e. the temperature of initial melting of the brass. Accordingly, a brass of the invention consists of from 60% to 85% of copper, from 0.9% to 1.3% of silicon with the remainder zinc. However, the high resistance to season cracking thus acquired is, in large part, lost if the brass thereafter is subjected to heat treatment at a temperature substantially below 725° C. Consequently, in the practice of my invention the last heat treatment must be conducted at a temperature in excess of 725° C., although prior annealing treatments and the like may be conducted at lower temperatures, say in the neighborhood of 300° C. to 725° C.

Following the heat treatment of the silicon-bearing brass at the high temperature, it can be worked mechanically without losing its high resistance to season cracking.

In the practice of my invention, it is desirable and in some cases essential to follow the heat treatment at a temperature of 725° C. or higher with a quick cooling operation, for example by quenching in water or in a current of cool air. Such quick cooling increases the resistance of silicon brass to season cracking and, as already noted, this resistance will be retained even after subsequent and severe cold working.

It will be recognized that the final heat treatment of the brass in accordance with my invention is conducted at temperatures considerably in excess of those customarily employed in brass annealing practice, in which stress relief or recrystallization is brought about by annealing in a range of about 250° C. to about 650° C.

In accordance with my invention, the requisite heat treatment and quickly cooling of the brass containing the silicon can be conducted at any stage in a brass fabricating operation, provided that following the heat treatment at the high temperature the brass is not subjected to subsequent heat treatment at a temperature below 725° C. and above that employed in baking organic finishes and the like, say 175° C. In other words, the relatively moderate heat treatment involved in baking organic finishes may not be injurious.

The practice of my invention as described above, i. e. a high temperature last heat treatment of a silicon-bearing brass (containing 0.9% to 1.3% Si) preferably followed by quick cooling, brings about the formation of a brass of novel structure which, in general, comprises alpha brass grains (with or without beta grass grains), together with an additional microstructural constituent present at the alpha grain boundaries, which constituent upon heat treatment for one hour at 375° C. will decompose into a plurality of other microstructural constituents that are visible in a polished section at a magnification of 1000 diameters, at least one of said plurality of constituents being other than alpha and beta brasses and harder than either. A certain amount of decomposition of this additional microstructural constituent may be tolerated without great sacrifice of resistance to season cracking. Consequently, the brass made in accordance with my invention may contain some of the decomposition products of the additional microstructural constituent, provided that a substantial proportion of the additional microstructural constituent remains.

The structures described above and developed by annealing at temperatures of 725° C. or above persist in subsequent cold working and may be detected in the annealed material both before and after cold working.

I have found that the additional microstructural constituent identified above is always present in silicon brasses which manifest adequate resistance to season cracking, and the presence of this constituent is a reliable index as to whether or not a given silicon-brass has the desired quality. The chemical analysis of the additional microstructural constituent has not been determined, but the constituent is easily recognized because of its property of decomposing upon mild heat treatment, (say any annealing conducted at a temperature much below 725° C.) to form the plurality of other microstructural constituents at least one of which is harder than alpha or beta brass. Thus, upon decomposition, the second additional microstructural constituent may develop a fibrous structure (principally adjacent the alpha grain boundaries) in which some of the fibers are very hard. On the other hand, the additional microstructural constituent may decompose to give a mottled structure in which hard spots are recognizable. It should be borne in mind that prolonged annealing at temperatures below 725° C., say annealing for 1 hour at 500° C., results in the complete disappearance of the additional microstructural constituents.

Another important characteristic of the brass of the invention resides in its small grain size, which does not exceed 0.1 millimeter, i. e. the average grain diameter is below this figure.

In general, the additional microstructural constituent tends to occur at the alpha grain boundaries and in many instances substantially envelopes the alpha grains. In addition, the second microstructural constituent may occur within the grains, either alpha or beta.

The application of my invention to the manufacture of brass cartridges is simple. Ordinarily, such cartridges have been made of high grade brass containing about 70% copper and 30% zinc without other alloying ingredients. This brass is worked into a body through several stages, with an annealing at about 600° C. following each stage. After the last body annealing, it is customary to anneal the neck portion of the case prior to tapering it to bullet diameter and after tapering to apply a recrystallizing anneal to the mouth. In the practice of my invention the only required modification of the foregoing is to include the required proportion of silicon (i. e. 0.9% to 1.3%) in the initial alloy and to conduct the last body anneal at a high temperature, say between 725° C. and 870° C.—the approximate solidus for 70-30 brass containing 1% silicon. The last body annealing should be followed by quick cooling, preferably by water quenching, although in the case of single thicknesses of brass (say 1/16 inch thick) air cooling may be sufficiently rapid.

The annealing treatments conducted on the neck and mouth portions of the cartridge case subsequent to the final body annealing do not deleteriously influence the cartridge cases or detract from the value of the invention as applied to the fabrication of such products, because season-cracking failures are less serious at the neck and mouth portions of a cartridge case than at the head end of the cartridge case, where the two anneals (neck and mouth) have little effect. Moreover, season cracking at neck and mouth are avoidable by careful manufacture. Hence in the head the structure that manifests high resistance to season cracking (and which is developed in the final body anneal at the higher temperature) is preserved.

My invention will be more thoroughly understood in the light of the following detailed description, taken in conjunction with the accompanying drawings in which Fig. 1 is a graph illustrating resistance to season cracking of silicon brass in its relation to annealing temperatures.

Fig. 2 is a graph illustrating the effect of annealing temperature on the grain size of brass with and without silicon; and Figs. 3, 4, 5 and 6 are photomicrographs illustrating the effect of various annealing treatments on the microstructure of a silicon brass.

Generally speaking, the higher the annealing temperature above the minimum of 725° C., the greater is the resistance of the final product to season cracking. This is shown in Fig. 1, which is a graph of results obtained with commercial 70-30 cartridge brass and with a brass of similar composition except that it contained 1.2% silicon. Both kinds of brass were annealed for one-half hour in nitrogen at various temperatures and water quenched. Thereafter all the samples were subjected to a stress-cracking or season-cracking test in an atmosphere of ammonia, carbon dioxide, air and water vapor while the samples were under a tensile stress of 15,000 lbs. per square inch. On Fig. 1, the time to failure in minutes is plotted on a logarithmic scale against annealing temperatures in degrees centigrade.

Referring to Fig. 1, it will be observed that the resistance of the conventional cartridge brass as rolled was about 500 (minutes to failure). This as increased to a maximum of about 620 by annealing at 300 to 400° C. Higher annealing temperatures brought about a continued decrease in the resistance of the conventional brass to season cracking, so that when the material was annealed at 800° C. it had a resistance of only 130.

The brass containing 1.2% silicon had a higher initial resistance (1500) to season cracking. This resistance was decreased slightly by annealing temperatures up to about 550° C. and at the latter temperature had a resistance of about 900. There was a slight increase from the 900 figure as annealing temperatures were increased to 700° C., at which point the resistance to season cracking was about 1000. Above 700° C. however, the resistance to season cracking was increased markedly. Thus, annealing at 750° C. increased the season cracking resistance to almost 4000 and this was increased to 7000 when the annealing was conducted at 800° C. In short, it was possible in accordance with the practice of the invention to obtain a resistance to season cracking which was more than ten times that developed in conventional cartridge brass.

I have found that the presence of silicon within the range of 0.9% to 1.3% has a highly favorable effect upon the microstructure of the brass in that it tends to inhibit grain growth brought about by recrystallization. This is illustrated in Fig. 2 which shows the effect of annealing at various temperatures followed by water quenching upon the conventional cartridge brass of Fig. 2 and upon a chemically similar cartridge brass except that it contains 1.2% silicon. It will be observed that in the case of conventional cartridge brass, high annealing temperatures tend to develop a structure that is far too coarse and not tolerated in military specifications. Thus, annealing at 600° C. brings about the formation of grains having an average diameter of about .08 millimeter. The grain size is increased to .2 millimeter by annealing at 750° C. Since a grain size in excess of 0.2 millimeter is highly undesirable, it is apparent that high temperature annealing cannot be employed in the case of conventional cartridge brasses.

In contrast with the effect of high temperature annealing upon conventional cartridge brasses, Fig. 2 shows that in the case of the silicon brasses of my invetnion, high temperature annealing does not bring about excessive increase in grain size. Up to a temperature of 450° C., no increase in grain size occurs. Between 450° C. and 700° C., the brass recrystallizes with an increase in grain size to about .04 mm. and thereafter the curve is substantially flat, the maximum grain size obtained being .04 millimeter. This is well within the tolerance established by military specifications.

The cracks developed in the foregoing tests and in parallel tests employing mercury as the stress-cracking agent were subjected to microscopic examination. It was found that the path of failure in conventional cartridge brass was intercrystalline whether the stress-cracking agent were ammonia or mercury. However, in the silicon alloys, the path of failure was intercrystalline when the stress cracking agent was mercury but generally transcrystalline in the ammonia stress cracking test.

The microstructure of alloys made in accordance with my invention will be more thoroughly understood in the light of Figs. 3 to 6, which are photomicrographs of 70-30 brass containing 1.2 silicon and subjected to various annealing procedures. In all cases the brass contained 69.8% copper, 1.2% silicon, 0.005% iron. less than 0.01% lead and the balance substantially all zinc. This alloy was cast as a 1" by 3½" by 10" slab. Thereafter the slab was subjected to the following series of operations:

1. Milling to 0.83" thickness.
2. Homogenization by heat treatment for 24 hours at 700° C.
3. Cold rolling to 0.340" thickness.
4. Annealing for 30 minutes at 625° C.
5. Pickling.
6. Cold rolling to 0.130" thickness.
7. Annealing for 30 minutes at 625° C.
8. Pickling.
9. Reannealing for 30 minutes at 800° C.
10. Quenching in water.
11. Pickling.
12. Cold rolling to 0.045" thickness.

Fig. 3 represents the structure of the brass following annealing for 30 minutes at 625° C. followed by air cooling. The magnification is approximately 75 diameters and the etchant employed prior to photographing the polished section comprised 5 parts of ammonium hydroxide to 1 part hydrogen peroxide. The structure shown is similar to that obtained in ordinary commercial brass annealing and lacks grain boundary constituents. In other words, Fig. 3 illustrates the structure obtained in annealing silicon brasses below 725° C. (without prior annealing at temperatures above 725° C.) and is not greatly different from that obtained in conventional annealing of ordinary brass.

Fig. 4 represents the structure obtained when the silicon brass was annealed for ½ hr. at 800° C. followed by water quenching. The magnification in Fig. 4 is approximately 250 diameters and the etchant employed on the polished section was 10 grams of chromic acid in 100 cc. of water to which 5 drops of hydrochloric acid had been added. Fig. 4 illustrates the micro-structure of the alloys of my invention and shows the clear undecomposed additional constituent at the grain boundaries.

Figs. 5 and 6 are photomicrographs of a part of the specimen of Fig. 3 which was subjected to a further anneal.

Thus, this part, following the annealing at 800° C. and the quenching in water, was reannealed for 1 hr. at 375° C. and air cooled. The reannealing and the slow cooling brought about a decomposition of the additional constituent at the grain boundaries with the resultant formation of the new constituent which is harder than both alpha and beta brass. Fig. 5 shows the structure at 250 magnifications and Fig. 6 shows the structure at 1000 magnifications.

In Fig. 6 the hard constituent, resulting from the decomposition of the constituent shown in the grain boundaries of Fig. 3, is particularly apparent. It is represented by the dark lines and dots on the photomicrograph.

I claim:

1. A brass having high resistance to season cracking consisting essentially of zinc, copper and 0.9% to 1.3% silicon and comprising alpha brass grains together with an additional microstructural constituent present at the alpha grain boundaries, which constituent is formed by heat treatment at a temperature ranging from 725° C. to the solidus and upon heat treatment for one hour at 375° C. is destroyed by decomposition into a plurality of other microstructural constituents that are visible in a polished section at a magnification of 1000 diameters, at least one of said plurality of constituents being other than alpha and beta brasses.

2. A brass having high resistance to season cracking consisting essentially of zinc, copper and 0.9% to 1.3% silicon and comprising alpha brass grains together with an additional microstructural constituent and a plurality of other microstructural constituents resulting from decomposition of a portion of the additional constituent during heat treatment of the brass at moderate temperatures, at least one of said plurality of constituents being harder than alpha and beta brasses and visible in a polished section at a magnification of 1000 diameters.

3. A brass having high resistance to season cracking consisting essentially of zinc, copper and 0.9% to 1.3% silicon and comprising alpha brass grains together with an additional microstructural constituent present at the alpha grain boundaries, which constituent is formed by heat treatment at a temperature ranging from 725° C. to the solidus and upon heat treatment for one hour at 375° C. is destroyed by decomposition into a plurality of other microstructural constituents that are visible in a polished section at a magnification of 1000 diameters, at least one of said plurality of constituents being other than alpha and beta brasses, the average grain diameter of the brass being less than 0.1 millimeter.

4. A rolled brass article having high resistance to season cracking consisting of from 60% to 85% of copper, from 0.9% to 1.3% of silicon with the remainder substantially all zinc, said brass comprising alpha brass grains and having been subjected to a final heat treatment at a temperature in the range from 725° C. to the solidus and cooled quickly.

5. In the fabrication of cartridge cases from brass, the improvement which comprises forming the cases from brass containing about 70% copper, about 0.9% to 1.3% silicon and the remainder zinc, conducting the last annealing step at a temperature of from 725° C. to the solidus, and quickly cooling the cases from said temperature range.

6. In the fabrication of articles from brass, the improvement which comprises forming the articles from brass containing from 60% to 85% of copper, from 0.9% to 1.3% of silicon and the remainder zinc, mechanically working the brass, giving the mechanically worked articles a final heat treatment at a temperature of from 725° C. to the solidus, and quickly cooling the brass from said temperature range, whereby the resistance of the brass to season cracking is enhanced.

GERALD H. EDMUNDS.